United States Patent [19]

Froessl

[11] Patent Number: 4,553,261
[45] Date of Patent: Nov. 12, 1985

[54] DOCUMENT AND DATA HANDLING AND RETRIEVAL SYSTEM

[76] Inventor: Horst Froessl, Gutenbergstrasse 2-4, D-6944 Hemsbach, Fed. Rep. of Germany

[21] Appl. No.: 499,500

[22] Filed: May 31, 1983

[51] Int. Cl.⁴ .............................................. G06K 9/82
[52] U.S. Cl. ..................................... 382/57; 340/707; 340/709; 364/188; 382/61
[58] Field of Search ............... 382/57, 61, 7; 340/707, 340/715, 709, 710; 364/188, 189, 190, 192, 518, 521

[56] References Cited

U.S. PATENT DOCUMENTS

| | | | |
|---|---|---|---|
| 2,877,951 | 3/1959 | Rohland | 235/61.11 |
| 3,181,119 | 4/1965 | Rabinow | 382/57 |
| 3,271,738 | 9/1966 | Kamentsky | 382/57 |
| 3,273,130 | 9/1966 | Baskin et al. | 382/57 |
| 3,536,950 | 10/1970 | Johnston et al. | 382/61 |
| 3,540,012 | 11/1970 | Ehrman | 340/709 |
| 3,553,646 | 1/1971 | Hardin et al. | 382/61 |
| 3,571,797 | 3/1971 | Hardin et al. | 382/61 |
| 3,582,886 | 6/1971 | Hardin et al. | 382/61 |
| 3,629,828 | 12/1971 | Demer | 382/61 |
| 3,643,215 | 2/1972 | Ingham et al. | 382/61 |
| 3,781,799 | 12/1973 | Robinson | 340/146.3 |
| 4,001,787 | 1/1977 | Kimmel | 340/172.5 |
| 4,121,196 | 10/1978 | Johnson et al. | 340/146.3 |
| 4,264,808 | 4/1981 | Owens et al. | 382/7 |
| 4,273,440 | 6/1981 | Froessl | 355/40 |
| 4,408,181 | 10/1983 | Nakayama | 382/61 |

Primary Examiner—Leo H. Boudreau
Assistant Examiner—Joseph Mancuso
Attorney, Agent, or Firm—Walter C. Farley

[57] ABSTRACT

A system for accepting documents and handling the data contained therein includes a reader and digitizer for producing and storing fragmented or digitized images simulating the characters and graphics on the document. Each document is marked with a unique identifying code. Selected portions of the data are converted to a machine code and stored and portions of the digitized material are also stored. Converted and unconverted segments can be recalled for complementing and verifying the machine code. Access is available to either in storage.

29 Claims, 5 Drawing Figures

DOCUMENT AND DATA HANDLING AND RETRIEVAL SYSTEM

This invention relates to methods and apparatus for handling documents and for providing techniques by which the contents of the documents, as well as the documents themselves, can readily be utilized and retrieved.

BACKGROUND OF THE INVENTION

In many organizations throughout the world, both governmental and private, a major problem is one of handling documents for a variety of purposes. The documents are of current as well as historic interest and the documents may contain information printed or typewritten by machine, printed or written by hand or pictures, drawings and other forms of representation commonly referred to today as "graphics". It is very often necessary to access selected information for various purposes within a short time, and the information must be accessed from a large volume of such information in the form of the documents. Not all of the information contained in the documents may be of importance. In addition, that which is of interest may be of greater or lesser degrees of importance, depending upon the documents and upon the nature of the organization.

Much information, particularly that which is of historical interest only, is being filed in the form of microfilm, microfiche or similar forms which are produced by what can be generically described as photographic techniques. In other cases, the information contained in the documents is converted to an encoded form which can be accomplished by such machines as optical character readers (OCR), despite the considerable expense of such machines, depending on the nature of the printing or typing in the original document; but other information must be entered into a system by a manual keypunch operation, a technique which has gained wide acceptance because of the unsatisfactory nature of alternative techniques, but which nevertheless has serious drawbacks because of the inherent problem of errors occurring simply because of the human process of retyping the information. A discussion of various data preparation devices and techniques is to be found in the Encyclopedia of Computer Science and Engineering, Second Edition, Van Nostrand, Reinhold Company, New York (1983) beginning at page 480. This text includes a review of the historical development of data preparation and also discusses the expense and difficulty of recycling information within a system to reduce the error percentage.

In most circumstances, it is not necessarily desirable to eliminate human intervention, nor can this be done as a practical matter. For example, if documents coming into an organization are to be handled and entered into a system, it is necessary for some human operator to review each document, determine its relevance and make some decisions. It is, however, desirable to remove the human process of retyping or keypunching the data because of the above-discussed error entry problems. On the other hand, machine data entry preparation, such as OCR, in addition to the expense has the disadvantage that very often the total content of each document must be entered, an approach which is wasteful of mass storage, compounds the difficulty of locating and utilizing relevant information at a later time, and usually would necessitate reworking the data, depending upon its form and ultimate use.

BRIEF SUMMARY OF THE INVENTION

Accordingly, it is an object of the present invention to provide an organized system for selectively entering the contents of documents into a storage facility from which the material can be selectively extracted for various purposes.

A further object is to provide a unique technique for cross referencing the stored pattern and the original document, the combination of storage and correlation being usable, in many circumstances, to completely eliminate further handling of the original document itself between organizational units.

A further object is to provide such a system in which the total amount of storage required is reduced because of the selectivity of the storage technique, and wherein the saved memory capacity is usable to correlate the filed data with the source documents, permitting carrying of this link forward to provide a bibliography of source information in, for example, report preparation.

A still further object is to provide efficient techniques for verification and complementing of the stored data in a codification and storage procedure.

Yet another object is to provide such a system which is capable of automatic selection of desired data from a plurality of similar documents, i.e., like format but containing variations in data content, by programmable machine, thus allowing the human involvement to be at a higher level and to be greatly reduced.

Briefly described, the invention includes an apparatus for gathering data from a plurality of source documents comprising means for sequentially receiving documents, optically scanning each document and forming series of digitalized electrical signals representative of digitalized signals representative of digital patterns substantially identical to patterns on each document from which an image of each document can be reproduced; means for imprinting in a predetermined area of each document a set of characters uniquely identifying each document and for producing electrical signals representative of said characters; and buffer means for storing the series of digitalized signals along with said signals representative of said characteristics.

In another aspect, the invention includes an apparatus for selectively storing information derived from source documents comprising means for receiving source documents, optically scanning each document and forming series of digitalized electrical signals representative of digitalized patterns of material on each document from which an image of each document can be reproduced, buffer means for storing the series of digitalized signals, means for recalling from said buffer means groups of said digitalized signals and for producing on a viewable screen an image of digitalized patterns of the document from which said signals were formed; manually operable control means for selecting a plurality of locations in said document to identify selected segments of the patterns therein and for adding to said selected segments address information to control subsequent disposition of said segments; and a mass data file for receiving said segments in digitalized form and said address information. The added address information can also be used to perform such functions as complementing the link to the source information for use in a specific report or an excerpt from a report which permits this link to be carried forward, providing, e.g., an automated audit trail.

A still further aspect of the invention includes a method of inputting and preparing data from source documents comprising the steps of scanning each source document and forming signals representative of digitalized patterns derived from images of characters and graphics thereon, temporarily storing the signals representative of the digitalized patterns, selecting segments of the stored signals for further processing, converting signals representative of digitalized patterns of characters in only the selected segments into a machine code, displaying the digitalized patterns from the storage of signals for each character not successfully converted into machine code, or ambiguous characters, along with a display of converted both before and after each unconverted character, manually entering a code for the digitalized pattern, and storing the machine code and digitalized pattern signal for subsequent use.

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE PREFERRED EMBODIMENTS

For purposes of the following disclosure it will be desirable to use terms in a specific way to avoid confusion. In the processes to be described the term "digitalization" and various forms thereof will be used to refer to a fragmenting of a symbol or pattern into an arrangement of light and dark elements, i.e., elements having contrast variations, and to signals representing those contrast variations or elements. An example of this would be an arrangement of dots which follow the lines of a letter of the alphabet such as might be produced by a dot matrix printer, and one or more series of electrical signals representing, respectively, the light and dark areas of the dots and their background.

Further terms to be used involve "code," i.e., "machine code," "coding" or "encoding" which refers to forming a code representation of a symbol using, for example, ASCII code, such that the code can readily be stored in a machine, in a magnetic medium or in some other form of memory and can be manipulated using conventional DP techniques.

In this connection, it will be observed that the digitalized pattern can also be stored, but the storage does not depend on recognition of the symbol nor need the symbol be actually recognizable. Encoding and storing the code, however, depends on recognition of the symbol as one of a predefined set and selection of an assortment of code elements which has been assigned to represent that symbol (or group of symbols). As used herein, the specific selection of the type of code will largely be ignored because that selection will depend primarily on the context in which the invention is used.

The term "data" will be used in a rather general sense to include information in human readable as well as machine readable or machine stored form.

"Character" is used to mean alpha-numeric symbols as well as other symbols such as mathematical operators, generally including any symbol having a recognizable and definable meaning to some group. That term differs from "graphics" which is used to mean drawings, graphs, etc.

Figure 1:
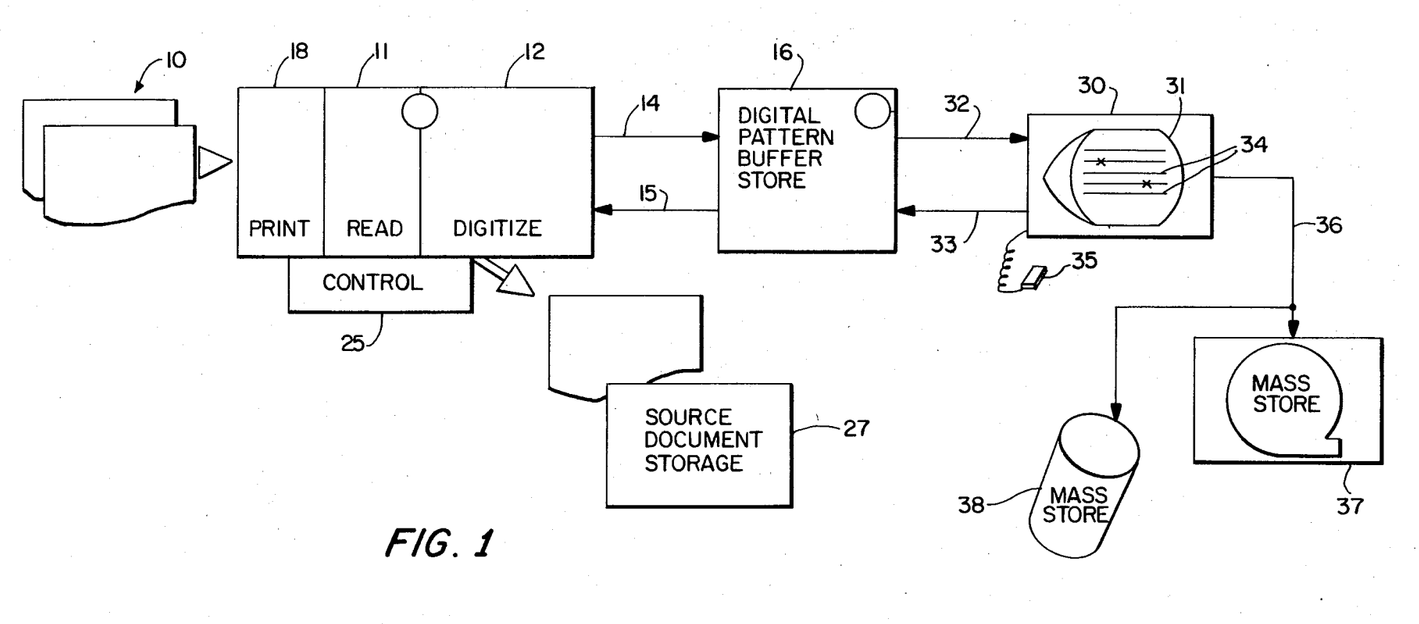
FIG. 1 is a schematic block diagram of a system in accordance with the invention.

Turning now to the drawings, it will be seen that the diagram of FIG. 1 shows a digitizer system for receiving source documents indicated generally at 10 which are fed into a device which will be referred to as a document reader 11 which performs the function of optically scanning each document page delivered to it, the reader having as an integral part thereof a digitizer 12 which performs the function of producing digitalized signals representative of digital patterns approximating the characters and graphics appearing on the source documents delivered thereto. This portion of the apparatus is known and is currently available on the market, a useful device being the Memorex PS100 OEM High-Speed Optical Page Scanner available from Memorex Corporation, Santa Clara, CA. The digitalized signals representative of the digital patterns of the characters and graphics appearing on the pages are supplied on a channel 14 to a store 16 which can be any convenient form of memory capable of accepting the signals and retaining them in an extractable and changeable form. Various forms of high density memory are usable for this purpose including hard magnetic disk, video disk, floppy disk and bubble.

Figure 2:
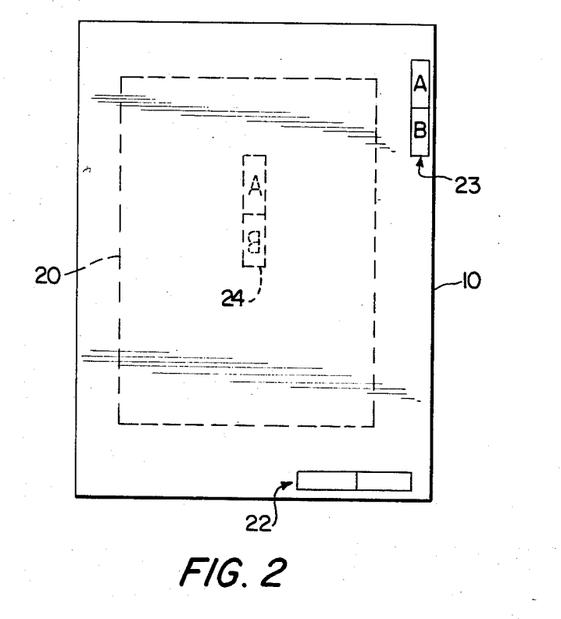
FIG. 2 is a plan view of a typical source document illustrating possible placement areas for printed identification.

Of particular significance is the inclusion in the apparatus shown in FIG. 1 of a printing device 18 which is illustrated as being at the input end of the apparatus and which, preferably, is in a very early portion of the system although it need not be the first element in a mechanical sense. The automatic printing may also take place prior to inputting the documents for digitalization, in a separate step. A printer which can be used for this purpose is the Centronics Model 154 sold by Centronics Data Computer Corp., One Wall Street, Hudson, NH. The purpose of printer 18 is to provide on each document which passes through the system a printed legend which uniquely identifies that document and which has useful information contained therein by which the document can be stored in an organized fashion and recovered quickly, if necessary. The printer can readily be arranged to print on any normally unused portion of the document so as to not interfere with the text appearing thereon. For example, as shown in FIG. 2, a typical document 10 has a region 20 in which, for a certain organization, text normally appears, the marginal areas usually being blank. In an organization which commonly attaches document by hole-punching at the top, the legend can be printed in a zone indicated generally at 22 near the bottom of the page or, if the document is normally stored by punching along the left-hand margin of the document, the legend can conveniently be printed either at the top or in zone 22 or in a zone 23. As will be recognized, the direction of feed of the document will determine whether a serial or parallel printer need be used for the zones indicated.

In either case, each zone includes a portion A and a portion B, one of which is printed with a sequence of human readable symbols indicating filing information such as, for example, a serial number which is different for each document and which can include date information and, if more than one system of the type shown in FIG. 1 is in use, an indication of which system handled the document or additional information needed for an operation. The other of portions A and B includes substantially the same information in a machine readable form which can employ symbols commonly readable by substantially all OCR systems such as the basic mathematical operators, periods and the like. With this imprinted legend, the document can readily be located manually or it can be located by a machine sorting system. If the system is used with documents which are frequently covered on one side with text, the printer can be arranged to print the legend on the back as indicated at 24. In that case, the zone again has portions A and B as described.

Imprinting of the legend, control of the feed and further functions are accomplished by a control unit 25 which is coupled to the printer, the reader and the digitizer and which not only controls the normal functions of the apparatus, such as providing the manufacturer-specified input signals, but also controls the printer to inscribe the proper sequence of symbols on each page and, in addition, incorporates with the digitized signal an address relating to the imprinted legend so that the signal on channel 14 to the storage unit 16 includes not only the digitalized signal representative of the digital patterns of the material appearing on the page in the region 20 but also includes address information such as that given in zone 22, 23 or 24. It is also important to recognize that the system provides for the handling of each source document only once unless unusual circumstances arise. Thus, after the document has been printed, read and the information therefrom digitized and supplied to store 16, the document is delivered to a storage facility 27 from which it would normally not be removed, although it can continue to remain available if desired, depending upon the nature of the organization employing the system and the nature of the documents themselves. As a minor exception to the "single handling" principle, it may be desirable to run the documents through a separate stack feeder and printer before the reader if differences in feed speed become significant because of the choice of certain printers or readers.

It is desirable to have bidirectional communication between the digitizer and the store so that the store can supply on a channel 15 information to the digitizer about available space remaining and can also be used for handshake and parity error-checking purposes.

With the apparatus thus far described, it is possible to provide a central processing facility in which incoming documents are handled only once for the purpose of passing them through the reader and digitizer apparatus, after which they are placed in storage or, conceivably, destroyed after a preselected lapse of time. All of the data from each document is available in a store so that it can be subsequently accessed, using the address information, so that the digitized signals can be employed to reproduce, on a viewable screen, a reproduction of the digital patterns approximating the data on each original source document. The stored data is conveniently a mixture of machine code and digitalized pattern signals.

It is also the philosophy of the invention to strategically position equipment of the described approach at one or several places within an operation, or in one place with several pieces of equipment. This is for the purpose of organizing the operation in such a way that all in- and outgoing documents are collected in whatever way the operation requires. This also permits collection and immediate transmission of data required to be viewed at one or various remote locations. The organization department of an operation, for instance, could enter a new procedure with drawings via the above approach, with the new procedure being retrievable based on known passwords with no paper, i.e., a procedure which needs to be distributed to the various organizational elements. Furthermore, there is no need for the paper (i.e., procedure) to be filed for later access. The same approach could be taken for the purpose of change control in an engineering operation where either the latest change of a drawing or its history could be retrieved and viewed. This approach requires a new organizational element with experienced and knowledgeable personnel.

FIG. 1 also shows apparatus for recalling and further processing the data stored in store 16. This apparatus, in a relatively simple form, includes a work station 30 having a viewable screen symbolically indicated at 31 on which groups of digital patterns can be displayed from store 16. Work station 30 can comprise, for example, a relatively simple personal computer with a similarly simple recall program to extract data from store 16 and display it on screen 31, the work station being capable of bidirectional communication with store 16 on channels 32 and 33. The existence of work station 30 at this point in the system is, however, extremely important as will be realized when recognizing that the data stored in store 16 is still in a digital pattern form and has not yet been sorted or selected nor is it yet in final storage. Work station 30 is provided with a manual control symbolically indicated at 35 which can comprise a simple form of cursor control, a simplified keyboard, a "mouse" or a lightpen, any of which are capable of positioning two or more cursors at selected locations in textual or graphic material displayed on screen 31. Thus, if it is assumed that lines 34 on screen 31 represent lines of characters which have been extracted from store 16, control 35 can be used to place cursors at, for example, the positions on the lines identified by the X symbols in FIG. 1. These cursors are used to identify those segments lying between the X's as being segments which are to be preserved for further processing or use. The X's can be used to select all of the data on the screen, none of the data on the screen, or any amount in between, the sequence of entering the material into storage being according to the sequence of activating the cursors. The selected data segments are then transferred on line 36 to mass storage facilities symbolized by the tape storage unit 37 or disc storage 38. A computer which is quite suitable for this purpose is the apple "LISA" computer system made by Apple Computer Inc., 10260 Bandley Dr., Cupertino, CA and described in the February 1983 issue of BYTE Magazine, p. 33 et seq.

The cursor control and entry commands can also be used to designate which segments are to be stored in digitalized form for subsequent conversion to machine code and which segments (especially graphics) are simply to be retained in digitalized form as a more suitable format than in machine code.

In addition to selecting segments of the data, the manual control 35 can also be employed to attach an address or keyword to the data segment indicating the nature of the subject matter or the organizational unit to which the subject matter should be directed, or both. In some circumstances, control 35 would necessarily be in the nature of a keyboard to provide a larger amount of control, but the actual size is not particularly significant. It is greatly preferred that only meaningful portions of the data in digital pattern form are preserved for mass storage and subsequent use. Additionally, the selected segments are identified in such a way that they can be acquired by symbols attached to them at work station 30 which will be referred to hereinafter as "passwords." It is obviously necessary for a trained individual to operate station 30, someone who is capable of viewing and comprehending at least the significance of the information being displayed and of attaching the desired code, using a lexicon for this purpose which is supplied by the organization. In a corporate environment, for example, the lexicon might include such organizational units as "accounting," "sales," "research and development," and the like, and can also include subunits such as will serve to identify specific research and development projects or topics within the R&D department. The exact nature of the passwords is, of course, not significant to the invention itself and will vary from one organization to another.

Figure 3:
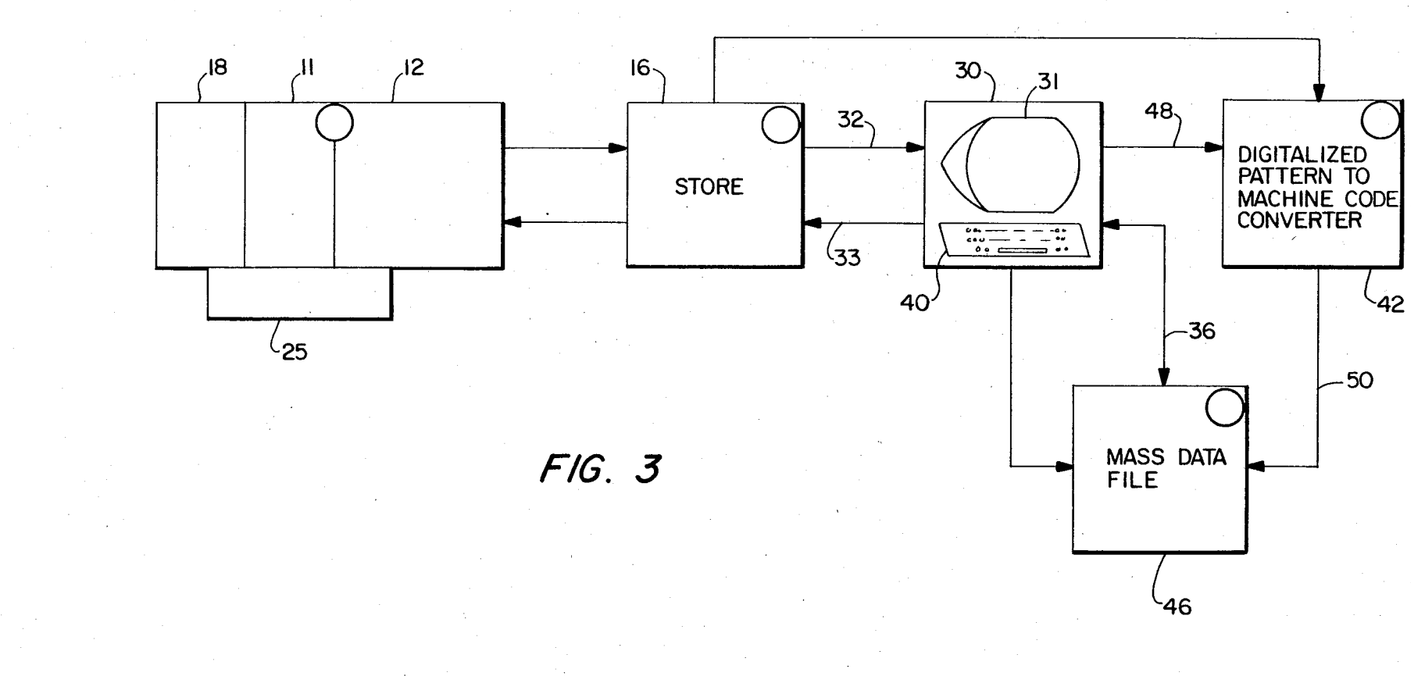
FIG. 3 is a schematic block diagram of a second embodiment of a system in accordance with the invention.

FIG. 3 shows a further embodiment of an apparatus in accordance with the invention in which the further step of conversion to a code is accomplished. Those portions of the system which have already been described will not be described again, their functions being substantially the same. In the embodiment of FIG. 3, work station 30 is shown as having, in addition to screen 31, a more complete keyboard 40, although the apparatus can still include a lightpen, mouse, joy stick or the like for cursor control.

In addition, the apparatus includes a converter/compiler 42 which is capable of converting digitalized signals representing digitalized patterns into a machine code such as ASCII, BCD or some other code. As will be recognized, the volume of the material is reduced at work station 30 by selecting data segments to be stored. However, in addition to storing the digitalized signals in a data file 46, the signals are supplied on a channel 48 to converter 42 to be converted into a code which can be processed and handled by a conventional computing device. The encoded data is then supplied on a channel 50 to a separate portion of data file 46.

As is well recognized, pattern converters of good quality are capable of recognizing a large percentage of the patterns presented to them, which patterns will then be successfully converted into the machine code and stored. It can be expected, however, that certain patterns will be not recognized or will be recognized as being ambiguous symbols, such as "5" and "S," "H" and "4," and the like. The digital patterns representing these ambiguous and unrecognized characters are stored in data file 46 and the machine code for all recognized symbols are stored in file 46 but those which are not recognized or which are thought to be ambiguous are replaced in storage, preferably in a separate portion thereof, with a code signifying a special identifying symbol such as a rectangle substituting for the character which is presenting the problem, plus a return address.

After a set of data has been stored, the symbol substituted for those characters which have been identified as unrecognized or ambiguous are returned to the screen along with a concurrent display of the digital pattern stored in file 46 for the same character. Preferably, the machine code symbol indicating the problem character is accompanied by a predetermined number of characters in either DP code or as digital patterns on either side of that symbol, e.g., 4 or 5 such characters, allowing the unknown character to be presented on the screen 31 in a context from which it can be recognized if the pattern is not. Also, the digitalized patterns for e.g., 3 to 5 characters on either side of the problem character can be displayed to place the character in context. The human operator, presumably capable of identifying the symbol, then inserts the appropriate symbol in machine code using keyboard 40, this inserted symbol replacing the rectangle and complementing the converted data stored in file 46.

As will be recognized from the above, human intervention is again necessary only for resolving ambiguities or similar problems which occur as a result of incomplete conversion. This intervention, of course, could take place in a separate step.

After the conversion has been completed and verified, the original data file can be retained or erased as a matter of organizational policy. Bearing in mind that the source documents are still available, identified by the unique codes previously described, and recognizing further that these unique codes still accompany the selected segments which have now been converted from their digitalized patterns to machine codes, it is a simple matter, if considered necessary, to return to the source document for purposes of finding support for the chosen segment. Thus, retaining the digital pattern file may not be necessary. However, when the source documents contain graphic information which is not convertible into machine code in the same fashion, retention of the digital pattern signals in memory is necessary.

Figure 4:
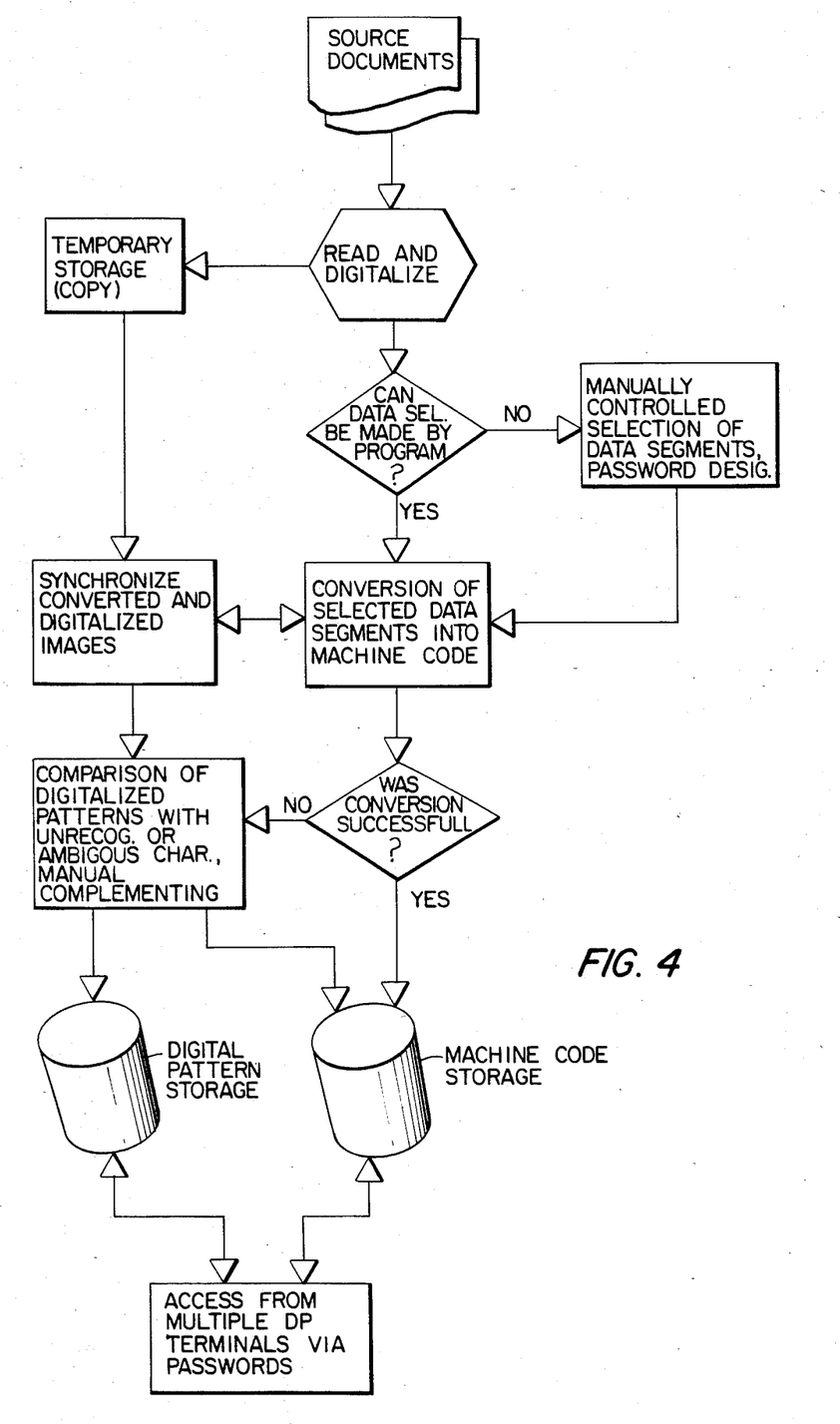
FIG. 4 is a flow diagram illustrating the sequences of steps in document and data handling in accordance with the method of the invention.

FIG. 4 illustrates a sequence of events which is substantially the same as that which has been described above. However, it should be recognized in reviewing the sequence illustrated in FIG. 4 that more than one work station 30 can easily, and would preferably, be involved. Thus, the same work station would not necessarily be used for segment selection and machine code conversion complementing. Indeed, it is entirely possible to have several work stations performing each task if justified by the volume of documents handled.

To briefly review FIG. 4, the source documents are supplied to apparatus to be read, digitalized and copied after which a decision is made as to whether the data selection can or cannot be made by a program. If the documents are of substantially identical format or have other characteristics which permit automatic handling for this purpose, the segments are selected by program and the selected segments are converted into machine code. If the segment selection cannot be made by program, the segments are selected by the manual control techniques discussed above and the selected segments are then converted. If the conversion was successful, the converted data is supplied to machine code storage. If not, the ambiguous or unrecognized portions are compared with the digitalized patterns and the machine code data is complemented manually, the additional code segments being supplied to machine code storage. In each case, the digital patterns are stored.

The stored patterns and machine codes are then available through the passwords previously described and can be used for further processing.

Figure 5:
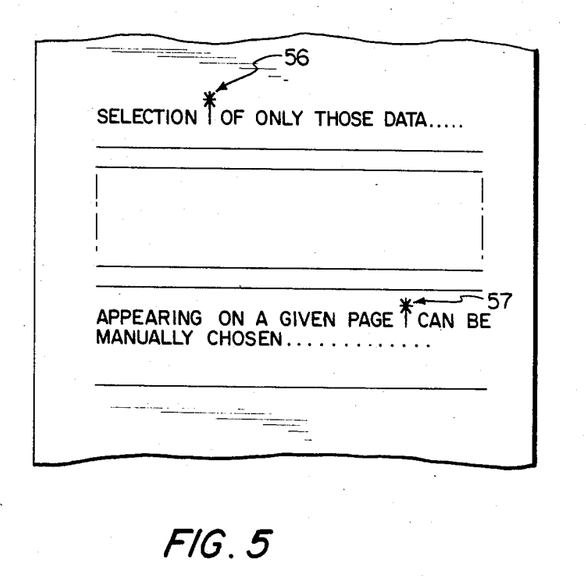
FIG. 5 is a plan view of a typical text page illustrating a further technique involving document preparation.

An additional concept is illustrated in FIG. 5 which involves preparing documents for data segment selection in an automatic sense but employing documents which are not, in any given batch, in a sufficiently similar format to permit selection by area designation in a program. FIG. 5 illustrates a section of a typical page of information in which a central portion thereof is to be selected for retention. The selected segment is identified by manually placing identification marks which are unique and different from the remainder of the text likely to appear on the page, the marks being chosen to be machine recognizable. In the example illustrated, marks 56 and 57 have been placed on the page, indicating the beginning and end points of the selected segment. Thus, the phrase beginning "of only . . . " and ending " . . . given page" will be retained and the remainder will not.

Marks such as those shown in FIG. 5, or any other uniquely distinctive marks which can be placed in a position between words, can be added to the page by an individual with a simple marker such as a rubber stamp. Then, when the information is read and digitalized and the decision is made about whether the data selection can be made by program, the answer to that last question is "yes" because the machine is capable of recognizing these symbols which have been previously added to the page. While this initial preparation step is necessary in order to accomplish automatic selection, the time involved is not significantly greater than that required for machine selection, as discussed in connection with FIG. 1, and the process does not occupy a terminal which can then be used for other purposes.

From the foregoing, it will be apparent that a system in accordance with the invention permits increased flexibility and efficiency in the extraction of data from documents. When dealing with batch type documents (meaning a large number of documents having data items arranged in a uniform format) the data collection can be fully automatic, the data can be collected in any desired sequence, independent of the document format, and the human effort can be reduced by as much as 95%. Also, the format need not be marked on the documents, i.e., they need not have the customary "boxes" and labels. When dealing with single-type documents, collection flexibility still exists, although an operator is used to select either by a work station such as 30 (FIGS. 1, 3) or by a pre-marking (FIG. 5) for automatic collection. Human effort reduction is in the order of more than 50%.

Conversion and verification into machine code such as ASCII is accomplished using retrievable digitalized images and there is consistent retrieval code correlation between the original document, the stored digitalized image of selected segments and the machine coded store. Even those unrecognized portions (e.g., handwritten) which are beyond the capability of today's OCR equipment can be handled in a mixed document. Because of the dual storage, documents with graphics can be stored and retrieved, as well as important signatures, and can be "filed" in the most effective way for the particular subject matter, i.e., with or without conversion to machine code, etc.

The material can also be designated for either immediate transmission to an organizational unit (in the sense of "electronic mail") or for subsequent access by one or more units. A degree of security can be provided, if appropriate, by limiting access to certain designated units, all of this being a function of the passwords assigned. Access to documents of wide interest can be made almost immediately available to everyone at once because the text can be accessed rather than needing to circulate an original or make numerous copies for distribution. Decentralization of the organization has no negative effect on this kind of information availability.

While certain advantageous embodiments have been chosen to illustrate the invention, it will be understood by those skilled in the art that various changes and modifications can be made therein without departing from the scope of the invention as defined in the appended claims.

What I claim is:

1. An apparatus for gathering data from a plurality of source documents comprising
    means for sequentially receiving documents, optically scanning each document and forming a series of digitalized signals representative of digital patterns closely approximating patterns on each document from which an image of each document can be reproduced;
    means for imprinting in a predetermined area of each document a set of characters uniquely identifying each document and for producing electrical signals representative of said characters;
    buffer means for storing the series of digitalized signals along with said signals representative of said characters;
    means for recalling from said buffer means groups of said digitalized signals and for producing on a viewable screen an image of the digitalized patterns of the document from which said signals were formed;
    manually operable control means for selecting a plurality of locations in said document image to identify selected segments of the digital patterns therein and for adding to said selected segments address information to control subsequent disposition of said segments; and
    a mass data file for receiving and storing said segments in digitalized form and said address information.

2. An apparatus according to claim 1 wherein the set of characters printed by said means for imprinting includes concurrently printed subsets of characters in machine readable form and in human readable form including essentially the same information.

3. An apparatus according to claim 2 wherein said predetermined area is an edge of each document.

4. An apparatus according to claim 1 wherein said mass data file comprises video disc means for receiving and storing.

5. An apparatus according to claim 1 and further comprising
    means for recalling said digitalized signals from said buffer means and for converting said signals into signals forming a machine code; and
    means for storing said code signals.

6. An apparatus according to claim 5 wherein said mass data file comprises video disc means for receiving and storing.

7. An apparatus according to claim 5 and comprising means for identifying signals representative of unrecognized and ambiguous digitalized patterns and for including a distinctive marker code correlated with such code signals in said means for storing;

means for recalling code signal groups including said marker codes and displaying on a screen groups of code-generated symbols each including an unrecognized signal;

means for displaying the unrecognized digitalized pattern concurrently with the symbols generated from said groups of code signals on said screen for human review; and means for manually entering a symbol code to replace said marker code and the signals representing said unrecognized or ambiguous symbols.

8. An apparatus according to claim 7 wherein said manually operable control means includes a manipulatable control for positioning cursors at said locations.

9. An apparatus according to claim 7 wherein said manually operable control means includes a lightpen, and said screen includes means responsive to said lightpen to establish an identifying element at locations contacted by said pen.

10. An apparatus according to claim 1 wherein said manually operable control means includes a manipulatable control for positioning cursors at said locations.

11. An apparatus according to claim 1 wherein said manually operable control means includes a lightpen, and said screen includes means responsive to said lightpen to establish an identifying element at locations contacted by said pen.

12. An apparatus for selectively storing information derived from source documents comprising means for receiving source documents, optically scanning each document and forming a series of digitalized electrical signals representative to a digitalization of patterns on each document from which an image of each document can be reproduced, buffer means for storing the series of digitalized signals, means for recalling from said buffer means groups of said digitalized signals and for producing on a viewable screen an image of digitalized patterns of the document from which said signals were formed;

manually operable control means for selecting a plurality of locations in said document to identify selected segments of the patterns therein and for adding to said selected segments address information to control subsequent disposition of said segments; and a mass data file for receiving said segments in digitalized form and said address information.

13. An apparatus according to claim 12 and further comprising means for recalling said digitalized signals from said buffer means and for converting said signals into signals forming a machine code; and means for storing said code signals.

14. An apparatus according to claim 13 and comprising means for identifying signals representative of unrecognized and ambiguous digitalized patterns and for including a distinctive marker code correlated with such code signals in said means for storing;

means for recalling code signal groups including said marker codes and displaying on a screen groups of code-generated symbols each including an unrecognized or ambiguous signal;

means for displaying the unrecognized digitalized pattern concurrently with the symbols generated from said groups of code signals on said screen for human review; and means for manually entering a symbol code to replace said marker code and the signals representing said unrecognized or ambiguous symbols.

15. An apparatus according to claim 14 wherein said manually operable control means includes a manipulatable control for positioning cursors at said locations.

16. An apparatus according to claim 14 wherein said manually operable control means includes a lightpen, and said screen includes means responsive to said lightpen to establish an identifying element at locations contacted by said pen.

17. A method of inputting and preparing data from source documents comprising the steps of scanning each source document and forming signals representative of digitalized patterns derived from images of characters and graphics thereon, temporarily storing the signals representative of the digitalized patterns, selecting segments of the stored signals for further processing, converting signals representative of digitalized patterns of characters in only the selected segments into a machine code, displaying the digitalized patterns from the storage of signals for each character not successfully converted into machine code, manually entering a code for the digitalized pattern, and storing the machine code and digitalized pattern signal for subsequent use.

18. A method according to claim 17 and including displaying digitalized patterns of characters appearing both before and after each unconverted character.

19. A method according to claim 18 and further comprising concurrently displaying a plurality of converted characters appearing both before and after each unconverted character.

20. A method according to claim 17 and further including adding to sets of machine code signals a signal set representative of a password selected in accordance with a predetermined lexicon.

21. A method according to claim 17 wherein the step of selecting includes manually positioning a cursor at the beginning and end of each segment to be converted.

22. A method according to claim 18 wherein the manual positioning of a cursor includes applying a lightpen to the display to locate the desired cursor positions.

23. A method according to claim 17 wherein the step of selecting includes instructing a processor to select segments from selected areas of the source documents.

24. A method according to claim 17 and preceded by the step of imprinting in a predetermined zone on each document a set of characters uniquely identifying that document in human and machine readable form.

25. A method according to claim 17 and further including the step of adding to sets of the digitalized pattern signals a signal set representative of a password selected in accordance with a predetermined lexicon by which said sets of digitalized pattern signals can be subsequently accessed.

26. A method according to claim 25 wherein the step of selecting includes instructing a processor to select segments from selected areas of the source documents.

27. A method according to claim 25 wherein the step of selecting includes manually positioning a cursor at the beginning and end of each segment to be converted.

28. A method according to claim 27 wherein the manual positioning of a cursor includes applying a lightpen to the display to locate the desired cursor positions.

29. A method of preparing source documents and inputting selected data therefrom into a storage and retrieval system comprising     manually marking each source document with machine readable distinctive marks identifying one or more segments of material thereon which are to be stored, scanning each source document and forming signals representative of digitalized patterns derived from images of characters and graphics in the selected segments, temporarily storing the signals representative of the digitalized patterns, converting signals representative of digitalized patterns of characters in the selected segments into a machine code, displaying the digitalized patterns from the storage of signals for each character not successfully converted into machine code, manually entering a code for the digitalized pattern, and storing the machine code and digitalized pattern signal for subsequent use.

* * * * *